United States Patent [19]
Huang et al.

[11] Patent Number: 5,670,615
[45] Date of Patent: *Sep. 23, 1997

[54] QUATERNIZED TERTIARY AMINOMETHYL ACRYLAMIDE POLYMER MICROEMULSIONS WITH IMPROVED PERFORMANCE

[75] Inventors: Sun Yi Huang, Stamford; Andrea Leone-Bay; Joseph Michael Schmitt, both of Ridgefield; Paul S. Waterman, Shelton, all of Conn.

[73] Assignee: Cytec Technology Corp., Wilmington, Del.

[*] Notice: The term of this patent shall not extend beyond the expiration date of Pat. No. 5,627,260.

[21] Appl. No.: 448,163

[22] Filed: May 23, 1995

Related U.S. Application Data

[63] Continuation of Ser. No. 18,858, Feb. 12, 1993, Pat. No. 5,627,260.

[51] Int. Cl.$^6$ .............................. C08F 120/60; C02F 1/56
[52] U.S. Cl. .................... 528/486; 528/492; 210/734; 210/735; 524/521; 524/555; 524/922
[58] Field of Search .................... 210/734, 735; 524/555, 922, 521; 528/486, 492

[56] References Cited

U.S. PATENT DOCUMENTS

| | | | |
|---|---|---|---|
| 3,539,535 | 11/1970 | Wisner | 525/385 |
| 3,790,529 | 2/1974 | Fujimura et al. | 528/487 |
| 3,864,312 | 2/1975 | Suzuki et al. | 525/157 |
| 3,979,348 | 9/1976 | Ballweber et al. | 260/29.4 |
| 3,988,277 | 10/1976 | Witschonke et al. | 524/251 |
| 4,010,131 | 3/1977 | Phillips et al. | 523/337 |
| 4,021,394 | 5/1977 | Tuka et al. | 524/555 |
| 4,022,741 | 5/1977 | Tuka et al. | 523/336 |
| 4,073,763 | 2/1978 | Tai | 523/337 |
| 4,093,542 | 6/1978 | Dahmen et al. | 210/734 |
| 4,113,685 | 9/1978 | Hubner et al. | 524/421 |
| 4,120,840 | 10/1978 | Hurlock et al. | 260/29.4 |
| 4,146,499 | 3/1979 | Rosano | 252/186 |
| 4,179,370 | 12/1979 | Hubner et al. | 210/734 |
| 4,179,424 | 12/1979 | Phillips et al. | 260/29.4 |
| 4,182,699 | 1/1980 | Fan | 524/512 |
| 4,521,317 | 6/1985 | Candau et al. | 523/335 |
| 4,956,396 | 9/1990 | Kim et al. | 521/85 |
| 4,956,399 | 9/1990 | Kozakiewicz et al. | 523/223 |
| 4,956,400 | 9/1990 | Kozakiewicz et al. | 523/223 |
| 5,037,863 | 8/1991 | Kozakiewicz et al. | 523/223 |
| 5,037,881 | 8/1991 | Kozakiewicz et al. | 524/812 |
| 5,093,009 | 3/1992 | Candau et al. | 210/734 |
| 5,132,023 | 7/1992 | Kozakiewicz et al. | 524/922 |

FOREIGN PATENT DOCUMENTS

| | | | |
|---|---|---|---|
| 1204536 | 8/1974 | Canada. | |
| A-1 056 989 | 6/1979 | Canada. | |
| 2369215 | 5/1978 | France | C02B 1/20 |
| 1 489 046 | 10/1977 | United Kingdom. | |

OTHER PUBLICATIONS

Chemical Abstracts vol. 91, 1979; p. 36; Phillips, Kenneth G. et al; Quaternary modified acrylamide polymers.

*Primary Examiner*—Andrew E. C. Merriam
*Attorney, Agent, or Firm*—Frank M. Van Riet

[57] ABSTRACT

Quaternized tertiary aminomethyl acrylamide polymer emulsions are treated by 1) adjusting the pH to about 3.6 to about 4.8, 2) adding a formaldehyde scavenger, 3) adjusting the water content of the aqueous phase to result in about 10–45 weight percent of quaternized aminomethylated acrylamide polymer and 4) heating the resultant emulsion at from about 40° C. to about 80° C. for about 3 to about 20 hours so as to render them more stable, capable of inversion in water independent of water temperature or pH of the medium flocculant and superior dewatering ability.

30 Claims, No Drawings

QUATERNIZED TERTIARY AMINOMETHYL ACRYLAMIDE POLYMER MICROEMULSIONS WITH IMPROVED PERFORMANCE

This is a continuation of application Ser. No. 08/018,858, filed on Feb. 12, 1993, now U.S. Pat. No. 5,627,260, for QUATERNIZED TERTIARY AMMINOMETHYL ACRYLAMIDE POLYMER MICROEMULSIONS WITH IMPROVED PERFORMANCE.

The present invention relates to flocculants. More particularly the present invention relates to flocculants prepared as acrylamide polymer microemulsions. Most particularly, the present invention relates to quaternized tertiary aminomethyl acrylamide microemulsions.

BACKGROUND OF THE PRESENT INVENTION

The use and development of synthetic polymers as flocculants has progressed and evolved since their introduction in the early to mid 1950's. In use flocculants provide the ability to flocculate solids suspended in a liquid medium, usually aqueous, to form a distinct entity capable of being separated from that medium.

Generally it is believed that the mechanism whereby the destabilization of ionic suspended solids occurs is by the neutralization of the charge on such solids which contributes significantly to their suspension stability. Mere neutralization of the charge of such solids, due to their small size, is often insufficient to enable their efficient separation from the liquid medium in which they are suspended and it has been long recognized that synthetic polymers are helpful in agglomerating such solids into entities commonly referred to as flocculated solids or flocs. These precipitate like flocs may then be separated from the liquid medium in which they are contained for various reasons and purposes. In the area of water purification, such techniques are used to remove materials undesirable for inclusion in discharge waters and hence find their utility in the removal of materials from the final product of a purification process. In contrast, in the area of paper manufacture, such techniques are used in a similar way to include within the paper slurry solids, and hence the resulting paper, materials that would otherwise be lost from the paper during the water removal phase of its manufacture and which may also inhibit the efficiency of dewatering during that phase.

Most effectively, the source of charge destabilization of suspended solids may be incorporated into the synthetic polymer molecule by the use in the formation of the polymer of monomers having moieties, or by modifying polymers to provide such moieties on the polymers, which moietes contain an ionic pair which upon addition of the polymer to an aqueous medium, dissociate to result in the polymer itself carrying a charge. Thus, polymers useful in flocculation have developed to present day being high molecular weight polymers which in the presence of water form a polymeric flocculant medium to provide a high content of cationically charged sites combining the ability to both destabilize suspended solids and to physically link them together into insoluble entities thereby separating them from the liquid medium in which they were contained.

As indicated above, a clear line of distinction must be drawn between charge bearing synthetic polymeric flocculant materials and synthetic polymers having charge contributing moieties for it is not until such moieties undergo disassociation that such polymers can have the desired flocculant activity.

One of the most significant advances in synthetic polymers useful in flocculant applications was disclosed in commonly assigned U.S. Pat. No. 4,956,399. In that patent there was disclosed a process using an inverse microemulsion to form Mannich acrylamide polymers, their use as flocculants and specific compositions comprising emulsion microparticles containing (alk) acrylamide polymers substituted with tertiary aminomethyl groups and having an average particle size of from about 200 to about 4000 Å, about 0.02 to about 0.4 µm, in diameter. Theretofore, high molecular weight Mannich polyacrylamides (Mannich PAMs), while well known and used in a variety of flocculant applications, were associated with major drawbacks arising from cross-linking of the Mannich polyacrylamides which was particularly severe when polymer solids were increased.

Several approaches had been tried to overcome these problems. One approach was to make the Mannich PAMs at the site of use by inverting high solids inverse emulsion PAMs in water containing dialkylamines and formaldehyde. U.S. Pat. No. 4,021,394 and U.S. Pat. No. 4,022,741 describe continuous processes for the preparation of Mannich PAMs which entails inverting an inverse emulsion PAM in a process stream containing formaldehyde and a secondary amine and subjecting the stream to turbulence by in-line mixing to produce a 1–15% aqueous solution of Mannich PAM. This approach, however, suffered from the need to store multiple chemicals on site and from the problems inherent in running chemical reactions at such locations. Another approach had been to prepare dry Mannich PAMs, as described is U.S. Pat. No. 3,864,312; U.S. Pat. No. 3,539,535 and U.S. Pat. No. 3,790,529 or blends of dry PAMs with dry, low-molecular weight Mannich-base forming compounds which, when dissolved in water, react to produce Mannich PAMs, as described in EPO Patent No. 0,210,784. These approaches, in general, suffered from cross-linking problems, the reversibility of the Mannich reaction, the difficulty and length of time required to dissolve high molecular weight polymers, and other problems. Another approach was to make the Mannich PAM in inverse emulsions, such as described in U.S. Pat. No. 3,979,348; U.S. Pat. No. 4,093,542 and U.S. Pat. No. 4,010,131. While this approach produces a product with substantially higher solids, the average emulsion particle size thereof ranges from about 10,000–20,000 Å, about 10 to about 20 µm, in diameter, and consequently, cross-linking of the many polymer chains in each emulsion particle renders the polymers less effective. The cross-linking rate of such polymers can be reduced somewhat by adding fairly large quantities of stabilizers, such as described in U.S. Pat. No. 4,113,685 and U.S. Pat. No. 4,073,763, but cross-linking continues and such products thus possess a very limited shelf life.

Accordingly, there existed a need for a Mannich acrylamide polymer which could be prepared at high solids levels without extensive interpolymer cross-linking such that it could be economically transported and easily handled by the end user without the need for any on-site preparation.

As discussed in U.S. Pat. No. 4,956,399, it was discovered that Mannich acrylamide polymers, produced in the form of inverse microemulsions, gave superior performance relative to the Mannich acrylamide polymers of the then prior art and could be conveniently prepared at high solids content while maintaining a very low bulk viscosity. As disclosed, in contrast to solution and inverse emulsion Mannich acrylamide polymers of the then prior art which contained large quantities of polymer molecules in the same aqueous environment, the Mannich acrylamide polymers as manufactured in the microemulsion process in the aforesaid patent are isolated as individual, or at most, several, polymer molecules in each aqueous microemulsion micelle. Thus, the problem of large scale debilitating interpolymer cross-linking inherent in the solution and inverse emulsion products of the prior art was overcome.

Additionally, in contrast to the high bulk viscosities of the more stable dilute solution acrylamide polymers of the prior art, the microemulsion produced Mannich acrylamide polymers disclosed in that patent could be made at high solids levels while still maintaining an extremely low bulk viscosity.

Such a Mannich acrylamide polymer composition satisfed a long felt need and constituted a notable advance in the art. The methods of manufacture of such polymers, the polymers and their use are incorporated herein by reference to the aforesaid U.S. Pat. No. 4,956,396 as well as U.S. Pat. Nos. 4,956,400; 5,037,863; 5,037,881 and 5,132,023.

Interestingly, it has been observed that the manufacture of the above discussed polymers resulted in them being in what is believed to be a predisolved form within the aqueous microemulsion particle. By this is meant that the polymer is present in the microemulsion droplet in a hydrated form which is advantageous in the make-up of a synthetic polymeric flocculant medium for use in flocculant applications.

As indicated above, a line of distinction must be drawn between charge bearing synthetic polymer flocculant materials and synthetic polymers having charge contributing moieties for it is not until the latter is contacted with an aqueous environment that the charge neutralizing function of the polymer molecule is available for use. A number of researchers have made observations regarding the availability of theoretical charge, some postulating that availability as a measure of polymer dissolution. While there might be a relationship between the two, for a given molecule under a given circumstance, the inavailability of theoretical charge has no predictive value as to degree of dissolution, as factors such as stearic hindrance of the titrant on an otherwise soluble material could yield data indicative of a degree of charge unavailably. Similarly, accumulation of the titrant on the otherwise water-soluble polymer can itself render it insoluble in much the same way as the mechanism of flocculaion.

It has long been known that the availability of the theoretical charge on a polymer can be affected by stearic hindrance. Thus, branching that has occurred in prior art water soluble polymers, to the extent such branching exists, affects the degree to which ionic sites can be accessed especially if the moiety of opposite charge is of any size. This is true whether or not the polymer is soluble or is cross-linked to the point that it becomes insoluble which, in the case of the latter, has been present to varying degrees in prior art polymers for decades.

As discussed above in the case of Mannich polyacrylamides, excessive cross-linking, in particular, intermolecular cross-linking, has been long seen as detractive of polymer performance and it is believed that a major contribution was the unavailability of charge sites or the formation of water-insoluble water swellable gels.

The polymers produced by reverse phase microemulsion polymerization are conveniently employed as flocculants prepared in the form of dilute aqueous solutions to form a synthetic polymeric flocculant medium. These solutions are prepared by inverting the microemulsion into water, optionally in the presence of a breaker surfactant, or by recovering the polymer from the microemulsion, such as by stripping or by adding the microemulsion to a solvent which precipitates the polymer, e.g. isopropanol or acetone, filtering off the resultant solids, drying and redispersing in water. The microemulsion can also be stripped to increase the percentage of polymer solids thereof.

Concentrating dispersions of suspended solids can be carried out by adding an effective amount of the polymer in solution form (i.e. a flocculant medium) to the suspension to remove water therefrom and produce an effluent of desired characteristics.

The flocculant media are useful in facilitating a wide range of solid-liquid separation operations. The cationic polymers may be used in the dewatering of biologically treated suspensions, such as sewage and other municipal or industrial sludges, the drainage of cellulosic suspension such as those found in paper production, e.g. paper waste, and the settlement of various suspensions, i.e. refinery waste, food waste etc.

Despite the many advantages of the microemulsion formed polymers referred to above, commercial experience has shown opportunities for improvements. In particular, the amino methylated acrylamide polymer microemulsions have suffered from insufficient stability at elevated temperatures and problems associated with ageing of the microemulsion synthetic polymer flocculant material independent of the temperature or pH of said medium making them unacceptable for some specific applications depending on local conditions.

As indicated above, polymers produced by microemulsion reverse phase polymerization can be employed as dilute solutions to form a synthetic polymeric flocculant medium. In practice, the microemulsion is inverted into a large volume of water stripping the continuous oil phase from the aqueous micro droplets containing the polymer which is then mixed to form the diluted solution. The resulting solution is then aged to maximize the expected performance from the medium. While in most cases this can be accomplished in a relatively short period of time, it has been found that under certain conditions of temperature and alkalinity longer periods of aging are required which may necessitate the installation of storage tanks that may not be easily accommodated or desired at the user's site. In the alternative, it may be required to adjust either the temperatures and/or pH of the diluent water, one or both of which may be unacceptable to the user. The alternative of using the product without sufficient aging is that less than optimum flocs are obtained with the flocs sometimes being somewhat fragile or at the least an uneconomic use of the polymer. In such cases, the polymer is generally rejected for that particular application. Interestingly, it has been found that this diminished performance is not related to a lack of solubility of the polymer, which is believed already solubilized in its microparticle environment prior to inversion. Thus a need exists for an improved polymer having less dependence on temperature and pH or alkalinity for proper aging.

U.S. Pat. No. 3,988,277 teaches the stabilization of aqueous solutions of Mannich polymers against viscosity increase and gelation by the addition of an aldehyde scavenger thereto. Suitable scavengers include hydrazine, ammonia, morpholine, guanidine, dimethylamine and urea. The patent, however, fails to teach microemulsions and does not recognize the necessity of adjusting the pH to the range claimed herein. The patent also is silent with respect to the polymer concentration and the need for further heating after the scavenger addition.

Phillips et al., U.S. Pat. Nos. 4,010,131, and 4,079,027 disclose treating inverse emulsions or solutions of quaternary modified acrylamides with halogen free oxygen containing inorganic acids such as sulfurous acid, followed by heating to stabilize the quaternary modified emulsions. The patentees teach that sulfurous acid is used both to adjust the pH of the emulsion and as a formaldehyde scavenger. The references do not teach that the heat-treated inverse emulsion will invert in water independent of temperature and alkalinity. The references do teach, however, that improved storage stability and cationic charge are obtained, however, the inverse emulsions described must be inverted at alkaline pH of 8.0. The patents teach that an adjustment of the emulsion pH between 0–6 is required, however, when this teaching is applied to quaternary Mannich microemulsions (QMM), the product fails to fully age independent of temperature and pH. Thus, these references fail to teach the critical pH range claimed herein and also are devoid of any teaching of the necessity to adjust the water concentration of the aqueous phase of the microemulsion.

U.S. Pat. Nos. 4,113,685 and 4,179,370 disclose the stabilization of Mannich acrylamide polymer emulsions by adding thereto 1) a water-soluble salt of an amine, alone or 2) in association with an amine or ammonia, or 3) an ammonium salt of a mineral acid plus ammonia or 4) a carboxylic acid amide. The patentees, however, are silent with regard to the pH to which the emulsions are adjusted by the addition of these additives and do not recognize the advantages exhibited by the instant invention by including a formaldehyde scavenger, adjusting the polymer solids content of the aqueous phase of the emulsion and heating the resultant emulsion for a specific length of time. The referenced patents thus fail to teach the instantly claimed process.

U.S. Pat. Nos. 4,120,840 and 4,195,003 disclose that the use of orthophosphorous acid provides an odorless and effective formaldehyde scavenger as well as pH adjuster. The invention teaches a method for stabilizing water-in-oil emulsions of polytrimethylaminomethylol acrylamide using orthophosphorus acid, but did not produce a satisfactory emulsion when applied to quaternary Mannich microemulsions as judged from the standard discussed hereinafter.

Canadian Patent 1,204,535, teaches the use of sodium bisulfite as both an acid pH adjuster and formaldehyde scavenger prior to alkylating partially cationically modified acrylamide polymer emulsions. The products disclosed in this patent invert in water having a pH about 8.0 or greater, however, when the teachings of this patent are applied to microemulsions, they fail to produce products which invert in water of any temperature and alkalinity.

None of the prior art teachings provide a method for producing a quaternized tertiary aminomethyl acrylamide polymer microemulsion (QMM) which successfully inverts in water independent of the pH and temperature of the water and also provide improved dewatering characteristics.

SUMMARY OF THE PRESENT INVENTION

According to the present invention there is provided a method for treating a quaternized amino methylated acrylamide polymer microemulsion (QMM) comprising:

(a) adding to said quaternized amino methylated acrylamide polymer microemulsion:
  (i) acid, or a combination of acids, in an amount sufficient to provide a pH of from about 3.6 to about 4.8 in the resulting emulsion;
  (ii) from about 0.01 to about 30 mole percent of a formaldehyde scavenger compound based on the total moles of quaternized amino methylated acrylamide polymer microemulsion; and
  (iii) water in an amount such that the aqueous phase of the resulting microemulsion comprises from about 10 to about 45 weight percent of quaternized amino methylated acrylamide polymer microemulsion; and (b) heating the microemulsion obtained in step (a) to a temperature of from about 40° to about 80° C. for from about 3 to about 20 hours.

Additionally provided for herein are improved polymers produced by the above stated method as well as methods of flocculating suspended solids.

DETAILED DESCRIPTION OF THE PRESENT INVENTION

The compositions treated by the process of the present invention comprise (alk)acrylamide polymer-containing microemulsions, the (alk)acrylamide polymer being substituted with at least about 1 mole percent of tertiary aminomethyl groups and having an average particle size of from about 200 to about 4000 Å in diameter and are generally prepared by an inverse microemulsion polymerization process, such as taught in U.S. Pat. Nos. 4,521,317; 4,956,399; 5,037,881; 5,093,009 hereby incorporated by reference.

The backbones of the acrylamide polymers used in the process of the present invention may comprise units of such (alk)acrylamides as acrylamide, methacrylamide, ethacrylamide and the like. The backbones of the acrylamide polymers invention may also comprise an (alk)acrylamide copolymerized with a cationic or non-ionic, water-soluble, ethylenically unsaturated comonomer in amounts up to about 90%, by weight. Water-soluble, anionic comonomers may also be used in substantially lower amounts.

Useful cationic comonomers include diallyl dialkylammonium chlorides, N,N-dialkylaminoalkyl(meth)acrylates, N,N-dialkylaminoalkyl(meth)acrylamides, salts, quaternaries and mixtures thereof.

Anionic comonomers of the present invention may comprise acrylic or methacrylic acid, fumaric acid, crotonic acid, maleic acid, salts thereof; 2-acrylamido-2-methylpropane sulfonic acid; styrene sulfonic acid and their salts and the like.

Water-soluble, non-ionic comonomers generally comprise N-vinyl pyrrolidone, N,N-dialkylmethacrylamides, hydroxyalkyl methacrylates; N-vinylformamide, and the like. Small quantities, i.e., up to about 10% by weight of other copolymerizable comonomers, such as methyl acrylate; methyl methacrylate; acrylonitrile, vinyl acetate, styrene, etc. may also be used.

In general, microemulsion polymerization processes are conducted by (i) preparing a monomer microemulsion by mixing an aqueous solution of water-soluble monomers with a hydrocarbon liquid containing an appropriate surfactant or surfactant mixture to form an inverse microemulsion comprising small aqueous monomer solution droplets dispersed in the continuous oil phase and (ii) subjecting the monomer in the aqueous phase of the microemulsion to polymerization.

Suitable monomers are non-ionic, anionic and/or cationic and are as defined above. The aqueous monomer solution may contain such conventional additives as are desired. For example, the solution may contain chelating agents to remove polymerization inhibitors, chain-transfer agents, pH adjusters, initiators and other conventional additives.

In order to obtain an inverse microemulsion, it is generally necessary to use particular conditions whose main parameters are as follows: surfactant concentration, HLB of surfactant or surfactant mixture, temperature, nature of the organic phase and composition of the aqueous phase.

Essential to the formation of the microemulsion which may be defined as a transparent and thermodynamically stable solution comprising two liquids insoluble in each other and a surfactant, in which the micelles are usually 1000 Å or less in diameter, is the selection of appropriate organic phase and surfactant.

The selection of the organic phase has a substantial effect on the surfactant concentration necessary to obtain the inverse microemulsion and may consist of a hydrocarbon or hydrocarbon mixture. Isoparaffinic hydrocarbons or mixtures thereof are the most desirable in order to obtain inexpensive formulations. Typically, the organic phase will comprise mineral oil, toluene, fuel oil, kerosene, odorless mineral spirits, mixtures of any of the foregoing and the like.

The ratio, by weight, of the amounts of aqueous phase and hydrocarbon phase, is chosen as high as possible, so as to obtain, after polymerization, a microemulsion of high polymer content. Practically, this ratio may range, for example, from about 0.5 to about 3:1, and usually approximates 1:1.

The one or more surfactants are selected in order to obtain an HLB (Hydrophilic Lipophilic Balance) value ranging from about 7 to about 12. Outside this range, formation of inverse microemulsions generally are not attained. In addition to the appropriate HLB value, the concentration of surfactant must be such as to form an inverse microemulsion. Too low a concentration of surfactant leads to the formation of standard inverse macroemulsions and too high a concentration results in increased costs and does not impart any significant benefit. Typical surfactants useful may be anionic, cationic or nonionic and include sorbitan monooleate, polyoxyethylene(20) sorbitan monooleate, sodium dioctylsulfosuccinate, oleamidopropyldimethyl amine, sodium isostearyl-2-lactate and the like.

Polymerization of the microemulsion may be carried out in any manner known to those skilled in the art. Initiation may be effected with a variety of thermal and redox free radical initiators, including peroxides, e.g., t-butyl peroxide; azo compounds, e.g., azobisisobutyronitrile; inorganic compounds, such as potassium persulfate and redox couples, such as ferrous ammonium sulfate/ammonium persulfate. Initiator addition may be effected any time prior to the actual polymerization per se. Polymerization may also be effected by photochemical irradiation processes, such as ultraviolet irradiation or by ionizing irradiation from a cobalt 60 source.

It is possible to perform the Mannich substitution reaction at various stages in relation to the inverse microemulsion polymerization. The formaldehyde and secondary amine may be added after the inverse microemulsion polymerization of the (alk)acrylamide and then reacted with the resultant polymer to form the tertiary aminomethyl group on the (alk)acrylamide polymer backbone. It is also possible to react the (alk)acrylamide monomer with the formaldehyde and secondary amine prior to the inverse microemulsion formation and before polymerization of the monomers. Also contemplated, is adding the formaldehyde and secondary amine to the aqueous solution prior to polymerization and then polymerizing the (alk)acrylamide monomer and carrying out the Mannich reaction simultaneously.

Formaldehydes suitable are typically selected from formaldehyde, paraformaldehyde, trioxane, aqueous formalin and mixtures thereof. Secondary amines suitable are selected from those containing from about 2 to about 8 carbon atoms which are aliphatic, cyclic, straight chained or branched.

The Mannich polymers produced by the above procedures are then quaternized by reacting them with such quaternizing agents as methylbromide, methyl iodide, ethyl chloride, methyl chloride, dimethyl sulfate, benzyl chloride, benzyl bromide, alkyl chloride, and the like under known conditions.

The water soluble unstabilized QMM's treated in accordance with the process of the present invention are (alk) acrylamide-containing microparticles having an average particle size of from about 200 to about 4000 Å, preferably about 300 to about 2000 Å, most preferably about 350 to about 1000 Å, which are substituted with at least 1 mole percent of quaternized tertiary aminomethyl groups and can be represented by the following general formula:

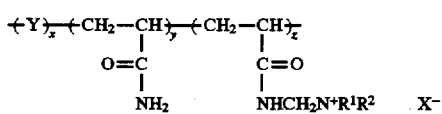

where x ranges from 0–50, y ranges from 0 to 99, z ranges from 1 to 100, x+y+z=100 and X represents an anion such as Cl$^-$, Br$^-$, I$^-$, CH$_3$SO$_4^-$ or SO$_4^-$, Y is a copolymerizable monomer polymerization residue R and R$^1$ are residue substituents from a secondary amine and R$^2$ is alkyl C$_1$–C$_4$), allyl or aralkyl (C$_7$–C$_{11}$).

The QMM's are treated by (a) adding with mixing to the untreated QMM an acid such that the pH range of the resulting QMM microemulsion is from about 3.6 to about 4.8; preferably about 3.8 to about 4.6, and a formaldehyde scavenger, (b) adjusting the polymer content of the aqueous phase to about 10 to about 45 wt. percent, preferably about 20–40, wt. percent, and (c) heating the QMM microemulsion obtained in step (b) to a temperature of from about 40° to about 80° C. for from about 3 to about 20 hours.

Any water-soluble acid may be used in the instant invention. The acid is preferably employed as an aqueous solution and preferably comprises (i) an organic carboxylic acid, an inorganic acid or a combination thereof in an amount sufficient to provide a pH of from about 3.6 to about 4.8 in the resulting emulsion; (ii) from about 0.01 to about 30 mole percent of a formaldehyde scavenger based on the total moles of quaternized amino methylated acrylamide polymer microemulsion; and (iii) water in an amount such that when added to the microemulsion the resulting aqueous phase contains from about 10 to about 45 weight percent of quaternized amino methylated acrylamide polymer microemulsion.

The acid, preferably an organic carboxylic acid, inorganic acid and/or combination thereof, is used in sufficient quantity such that the resulting pH of the microemulsion is from 3.6 to 4.8, preferably 3.8–4.6. The quantity of each individual acid or combination of acids employed in the stabilized solution is determined by the acidity (pka) or each individual acidic component. The total amount of acid used in the practice of the present invention may vary from about 1 to about 40 mole % based on the total number of moles of polymer present in the microemulsion. The only limitation on the acid used is that it be inert with respect to the ingredients which are present in the microemulsion system, i.e. emulsifier, polymer, oil and other generally added ingredients.

Acids which may be employed for use herein include, but are not limited to, mono and multifunctional carboxylic acids such as acetic, maleic, fumaric, formic, acrylic, succinic, lactic, citric and the like; inorganic acids such as sulfurous, phosphoric, phosphorous and sulfuric acids as well as salts of these acids such as the alkali salts of sulfurous acid, aluminum sulfate, aluminum chloride, sodium sulfate and the like. Any combination of the above-mentioned acids may be employed as long as the QMM microemulsion after the addition of the stabilizer solution has a pH within the range set forth above.

The formaldehyde scavengers useful herein are those water-soluble compounds which have the capability to react with formaldehyde. The source of formaldehyde in the QMM's of the present invention results from unreacted formaldehyde or from labile formaldehyde components that release formaldehyde. The quantity of formaldehyde scavenger used in the present invention ranges from about 0.01 to about 30 mole percent, preferably ranging from about 0.6 to about 15 mole percent, based on the moles of polymer in the microemulsion.

Formaldehyde scavengers include those known in the art, and include, but are not limited to, urea, substituted ureas such as ethylene urea, guanidine salts, dicyanidiamide, sulfurous acid and any of its alkali metal salts such as sodium bisulfite, sodium metabisulfite and the like, as well as phosphorous acid and mixtures of any of the foregoing.

The quantity of water preferably used in the stabilizer solutions is selected such that the resulting aqueous phase of the microemulsion contains from about 10 to about 43 weight percent polymer, based on the weight of the total aqueous phase, preferably from about 15–40 weight percent, same basis.

The formaldehyde scavenger and the acid, preferably in the form of an aqueous solution, thereof, as described hereinabove, are then added to the microemulsion with mixing. The resulting microemulsion is then heated to a temperature ranging from about 40° to about 80° C. for a time of from about 3 to about 20 hours. The heating step can be carried out immediately after addition of the acid, scavenger and/or water, however, it is also possible to delay the heating up to the desired time of use of the microemulsion as a flocculant.

The stabilized QMM obtained after the heating step will successfully invert when added to water independent of the temperature or pH of the water used. The QMM's produced by the process of the present invention will also have increased storage stability, and provide improved dewatering characteristics.

The polymers of the present invention can conveniently be employed as flocculants prepared in the form of dilute aqueous solutions. These solutions can be prepared by inverting the treated microemulsion into water, optionally but preferably, in the presence of a breaker surfactant, or by recovering the polymer from the microemulsion, such as by stripping or by adding the microemulsion to a solvent which precipitates the polymer, e.g., isopropanol or acetone, filtering off the resultant solids, drying and redispersing in water. The microemulsion can also be stripped of water to increase the percentage of polymer solids thereof. When a breaker surfactant is used, it is added to the microemulsion to help stabilize it during the acid/scavenger/water addition step and enable inversion of the emulsion thereafter. Sufficient breaker surfactant should be added so as to enable the inverted polymer in solution to reach its maximum solution viscosity. Breaker surfactant may be added to the microemulsions before quaterization of the Mannich polymer or immediately before addition of the acid.

Concentrating dispersions of suspended solids is carried out by adding an effective amount of the treated microemulsion after inversion to the suspension to remove water and thereby produce an effluent of desired characteristics.

The products produced by the process of this invention are useful in facilitating a wide range of solid-liquid separation operations. The cationic polymers may be used in the dewatering of biologically treated suspensions, such as sewage and other municipal or industrial sludges, the drainage of cellulosic suspensions such as those found in paper production, e.g., paper waste, and settlement of various suspensions, i.e., refinery waste, food waste, etc.

BEST MODE OF COMMERCIAL PRODUCTION OF QUATERNIZED TERTIARY AMINOMETHYL ACRYLAMIDE POLYMER MICROEMERSIONS

Subsequent to the filing of assignees prior applications for letters patent for microemulsion polymers, significant work has been undertaken in perfecting the process and products disclosed therein. At the time of this subsequent filing, improvements representing the best mode contemplated for the manufacture of such products at the time of this filing and which are subject to the improvements set forth herein are presented in the following eight (8) examples. These examples are in no way meant to limit the invention herein but are presented as examples of the best mode of making the subject polymer at the time of this filing.

PREPARATION OF POLYACRYLAMIDE (PAM) BACKBONE MICROEMULSION

Background Example 1

To 223 lbs of an organic solution containing 182 lbs of low odor paraffin oil, 29 lbs of Polyoxyethylene sorbitol fatty acid ester, 12.6 lbs of Sorbitan sesquioleate is slowly added 219 lbs of a pH=3 aqueous solution containing 100 lbs of acrylamide, 6 lbs of acetic acid, 0.2 lbs of isopropanol, 0.2 lbs ethylenediaminetetra-acetic acid tetra sodium salt, 0.15 lbs of a sodium bromate, 0.14 lbs of sulfuric acid and 112 lbs of water. The resulting monomer emulsion is sparged for 60 minutes with nitrogen. $SO_2$ gas is then bubbled in the emulsion at a rate maintaining the rate of temperature increase around 2° C./min. allowing a maximum batch temperature of 65° C. Once the AMD conversion is greater than 99% the batch is cooled to 30° C. The result is 443 lbs of a clear, stable PAM microemulsion having an SV between 3.0 and 4.0 cps.

PREPARATION N,N-DIMETHYLAMINOMETHANOL (DMAM-S)

Background Example 2

Paraformaldehyde 45 lbs (92%, 41 lbs real) is slowly added to an aqueous dimethylamine solution containing 64 lbs of real dimethylamine and 43 lbs water while maintaining the temperature below 30° C. until the solids dissolve. Dicyanamide 6 lbs and 7 lbs of sodium metabisulfite are added maintaining the temperature below 35° C. affording 203 lbs of DMAM-S.

PREPARATION OF PAM-MANNICH-75

Background Example 3

443 lbs of PAM microemulsion of Background Example 1 is placed in a reaction vessel at ambient temperature. To this are slowly adding 89 lbs of low odor paraffin oil followed by 203 lbs of DMAM-S of Background Example 2, the DMAM-S being added over a 1.5 hour period maintaining the temperature between 30°–35° C. The resulting PAM-Mannich microemulsion is stirred at this temperature for an additional 16 hours. The resulting PAM-Mannich, 734 lbs is obtained as an opaque microemulsion.

QUATERNIZATION OF PAM-MANNICH OF BACKGROUND EXAMPLE 3

Background Example 4

703 lbs of the PAM-Mannich of Background Example 3 is placed in a stirred pressure reactor and the temperature adjusted to 25° C. To this is added 84 lbs of methyl chloride at a rate maintaining the temperature below 32° C. and the reactor pressure below 30 psi. The resulting microemulsion is stirred at this temperature for an additional 18 hours. After this time, the pH of the emulsion is between 5 and 6 and the excess methyl chloride removed. To the resulting microemulsion is added 14 lbs of a 23% sodium metabisulfate solution. If desirable a breaker surfactant (25 lbs of Surfonic N-95) may be added at this time.

The resulting product is a clear, stable quaternized Mannich PAM microemulsion having an average of 75±5% cationic charge as measured by infrared analysis.

PREPARATION OF PAM-MANNICH-55

Background Example 5

443 lbs of PAM microemulsion of Background Example 1 is placed in a reaction vessel at ambient temperature. To this are slowly adding 89 lbs of low odor paraffin oil and 144 lbs of DMAM-S of Background Example 2 the DMAM-S being added over a 1.5 hour period maintaining the temperature between 30°–35° C. The resulting PAM-Mannich microemulsion is stirred at this temperature for an additional 16 hours. 675 lbs of PAM-Mannich microemulsion is obtained.

QUATERNIZATION OF PAM-MANNICH OF BACKGROUND EXAMPLE 5

Background Example 6

675 lbs of the PAM-Mannich of Background Example 5 is placed in a stirred pressure reactor and the temperature adjusted to 25° C. To this is added 700 lbs of methyl chloride at a rate maintaining the temperature below 32° C. and the reactor pressure below 30 psi. The resulting microemulsion is stirred at this temperature for an additional 18 hours. After this time the pH of the emulsion is between 5 and 6 and the excess methyl chloride removed.

The resulting product is a quaternized Mannich PAM microemulsion having an average of 55±3% cationic charge as measured by infrared analysis.

PREPARATION OF PAM-MANNICH-35

Background Example 7

443 lbs of PAM microemulsion of Background Example 1 is placed in a reaction vessel at ambient temperature. To this are slowly adding 885 lbs of low odor paraffin oil and 103 lbs of DMAM-S of Background Example 2 over a 1.5 hour period maintaining the temperature between 30°–35° C. The resulting PAM-Mannich microemulsion is stirred at this temperature for an additional 16 hours. 633 lbs of PAM-Mannich is obtained.

QUATERNIZATION OF PAM-MANNICH OF BACKGROUND EXAMPLE 7

Background Example 8

634 lbs of the PAM-Mannich of Background Example 7 is placed in a stirred pressure reactor and the temperature adjusted to 25° C. To this is added 81 lbs of methyl chloride at a rate maintaining the temperature below 32° C. and the reactor pressure below 30 psi. The resulting microemulsion is stirred at this temperature for an additional 18 hours. After this time the pH of the emulsion is between 5 and 6 and the excess methyl chloride removed.

The resulting product is a clear, stable quaternized Mannich PAM microemulsion having an average of 35±3% cationic charge as measured by infrared analysis.

IONIC REGAIN ANALYSIS OF MICROEMULSION

Background Example 9

An amount of a commercial production of American Cyanamid's Excel® flocculant comparable to the above referenced QMM-75 was added to deionized water and was gently stirred for two hours at ambient temperature to form a 1% solution. The resulting solution had a pH of 5.2. An aliquot of this solution was diluted to 0.1% with additional deionized water. The standard viscosity and cationic equivalent (CEQ) of the 0.1% solution were found to be 1.25 cps and 4.2 meq/g respectively. CEQ was measured by the technique described in J. Chem. Ed. 62(7), 627(1985). A 100 g sample of the 0.1% solution was sheared for 10 minutes at between 10,000–10,500 rpm in a Silverson homogenizer and the CEQ of the solution was measured to be 4.2 meq/g. The solution was then sheared for an additional 10 minutes in the same manner and the CEQ was measured to be 4.1 meq/g. Accordingly the ionic regain (IR) of the solution of polymer was found to be 0% wherein the ionic regain is calculated by the formula:

$$IR = (CEQ_{sheared} - CEQ) \times 100 / CEQ_{sheared}$$

Subsequently, a second sample of the same product was made up to a 1% solution in deionized water whose pH had been adjusted to 7. After stirring for two hours, this sample had a measured standard viscosity of 2.8 cps. This example demonstrates that the availability of cationic charge on this polymer is independent of the attainment of maximum viscosity (13.8 percent thereof in this example) of the polymer in solution.

DESCRIPTION OF THE PREFERRED EMBODIMENTS

The following examples are set forth for purpose of illustration only and are not to be construed as limitations on the present invention except as set forth in the appended claims. All parts and percentages are by weight unless otherwise specified.

Standard Viscosity (SV) as used in the examples below is measured by adding 8 grams of a 0.2% aqueous polymer solution to 8.6 g of a 2N sodium chloride solution, stirring the resulting mixture for 1 minute and determining the viscosity at 25°±0.1° C. using a Brookfield Viscometer with a UL adapter at 60 rpm.

0.2% Aqueous polymer solutions expressed in the examples are prepared by adding with good agitation the appropriate quantity of the microemulsion to the appropriate amount of deionized water at 25°±2° C. The resulting solution is then stirred for 2 hours before use. The pH of the resulting solution, as referred to herein is defined as its natural pH. When reference is to SV at pH=7, this procedure for such a designation involves adjustment of the 0.2% polymer solution pH to 7 and maintaining a pH of 7 throughout the 2 hour stirring time.

The specified pH of the QMM microemulsions is obtained by stirring the emulsion at 25° C., immersion of a ROSS© combination electrode Orion Model #8102, and allowing the pH reading to attain equilibrium, normally about 10 minutes.

The following examples teach the preparation of the acid/scavenger solutions as well as the treated QMM's. In each example, C designates "comparative".

Part A. The treated QMM's used in Tables 3, 4, 5, 6, 8, 11, 12, 13, and 15 are prepared as follows:

Acid/Scavenger Solutions

An appropriate quantity of deionized water is weighed into a suitable vessel containing a magnetic stir bar. The water containing vessel is placed on a stir plate and at low speed an appropriate quantity of scavenger is added. The solution is mixed until the scavenger is fully dissolved.

Then, an appropriate quantity of acid is added and stirred for a few additional minutes.

The compositions of the solutions are as follows:

1. Urea/Acetic Acid

| | |
|---|---|
| Urea | 2.6 parts |
| Glacial Acetic Acid | 10.34 parts |
| Deionized Water | 87.06 parts |
| Total | 100.00 parts |

2. Urea/Citric Acid

| | |
|---|---|
| Urea | 2.6 parts |
| Citric Acid | 4.95 parts |
| Deionized Water | 92.5 parts |
| Total | 100.00 parts |

3. Organic/Inorganic

| | |
|---|---|
| Sodium Metabisulfite | 6.4 parts |
| Citric Acid | 4.74 parts |
| Deionized Water | 88.86 parts |
| Total | 100.00 parts |

Post Treatment

To a 50 parts of QMM-75 in a suitable vessel, are added 0.75 parts of N-95 dropwise with good mixing. 10 Parts of the acid/scavenger solution is fed into the vessel using a syringe pump over a 20 minute period and stirring is continued for an addition 10 minutes. Another 0.75 parts of the beaker emulsifiers is added to the batch.

Heat Treatment

The vessel, covered loosely, containing the resultant emulsion is placed in an oven at 65°–68° C. for 7–16 hours or 78° C. for 4 hours.

Part B. The treated QMM's used in Tables 1, 2, 7, 9, 10, 13, and 14 are prepared as follows:

Breaker emulsifier (3.76 parts) is added to QMM-55 or QMM-35 (301.33 parts) with stirring. An appropriate quantity of acid/scavenger solution (see table below) is metered into the QMM. Breaker emulsifier (3.76 parts) is added to the resultant QMM and this mixture is heated to 70° C. for 7 hours.

1. Urea/Acetic Acid

| | |
|---|---|
| Deionized water | 77.7 parts |
| Glacial Acetic Acid | 14.1 parts |
| Urea | 2.7 parts |
| Total | 94.5 parts |

2. Acetic Acid/Urea/Alum

| | |
|---|---|
| Deionized Water | 65.9 parts |
| Glacial Acetic Acid | 3.6 parts |
| Urea | 2.9 parts |
| Alum | 2.9 parts |
| Total | 75.3 parts |

3. Lactic Acid/Urea

| | |
|---|---|
| Deionized Water | 69.1 parts |
| Lactic Acid | 3.2 parts |
| Urea | 3.0 parts |
| Total | 75.3 parts |

TABLE 1

Effect of Varying Maleic Acid on the Treatment of 55% Cationicity QMM at 22.2% Solids, 10 Mole % Urea and 70° C./7 Hours

| Example | Mole % Acid (on polymer) | SV (nat) | SV (pH 7) | Emulsion pH |
|---|---|---|---|---|
| 1 | 2 | 1.70 (5.21) | 2.1 | 4.7 |
| 2 | 5 | 2.57 (4.47) | 3.11 | 4.3 |
| 3 | 10 | 1.27 (4.07) | 1.52 | 3.73 |
| 4C | 15 | 1.17 (3.83) | 1.33 | 3.54 |
| 5C | 20 | 1.13 (3.81) | 1.3 | 3.24 |
| 6C | 25 | 1.16 (3.58) | 1.26 | 3.07 |

TABLE 2

Effect of Varying Maleic Acid on the Treatment of 35% Cationicity QMM at 19.5% solids, 15 Mole % Urea and 70° C./7 Hours

| Example | Mole % Acid (on polymer) | SV (nat) | SV (pH 7) | Emulsion pH |
|---|---|---|---|---|
| 7 | 2.1 | 1.95 (4.63) | 2.1 | 4.19 |
| 8 | 5.2 | 2.19 (4.23) | 2.7 | 4.18 |
| 9 | 10.4 | 1.28 (4.00) | 1.64 | 3.88 |
| 10C | 15.6 | 1.16 (3.88) | 1.72 | 3.49 |
| 11C | 20.8 | 1.14 (3.75) | 1.82 | 3.15 |
| 12C | 26.0 | 1.14 (3.70) | 1.36 | 2.99 |

TABLE 3

Effect of Emulsion pH on Product as Measured by SV 5 Mole % Urea, Various Acetic Acid Concentration, 25% Polymer Solids at 75% QMM Cationicity and 67° C./16 Hours Treatment

| Example | Mole % Acid on Polymer | 0.2% Solution pH | Emulsion pH | SV (nat) | SV (pH = 7.0) |
|---|---|---|---|---|---|
| 13C. | 1 | 4.9 | 5.2 | 1.8 | 2.0 |
| 14 | 10 | 4.28 | 4.56 | 2.6 | 2.62 |
| 15 | 20 | 4.25 | 4.38 | 2.77 | 2.70 |
| 16 | 30 | 4.25 | 4.28 | 2.80 | 2.84 |
| 17 | 40 | 4.20 | 4.17 | 2.74 | 2.74 |
| 18 | 50 | 4.08 | 4.15 | 2.79 | 2.74 |
| 19 | 70 | 3.80 | 3.90 | 2.0 | 2.40 |

TABLE 4

Effect of Emulsion pH on Product as Measured by SV 5 Mole % Urea, Various Citric Acid Concentrations at 25% Polymer Solids at 75% QMM Cationicity and 67° C./16 Hours

| Example | Mole % Acid on Polymer | 0.2% Solution pH | Emulsion pH | SV (nat) | SV (pH = 7.0) |
|---|---|---|---|---|---|
| 20C | 1 | 4.69 | 5.0 | 1.6 | 1.7 |
| 21 | 3 | 4.00 | 4.4 | 2.6 | 2.8 |
| 22 | 5 | 3.7 | 4.1 | 2.6 | 2.9 |
| 23C | 10 | 3.4 | 3.4 | 1.2 | 2.7 |
| 24C | 15 | 3.2 | 3.1 | 1.2 | 2.6 |
| 25C | 20 | 3.2 | 2.9 | 1.1 | 2.6 |

TABLE 5

Effect of Emulsion pH on Product as Measured by SV 5 Mole % Urea, Various Citric Acid Concentrations at 25% Polymer Solids at 75% QMM Cationicity and 67° C./16 Hours

| Example | Mole % Acid on Polymer | 0.2% Solution pH | Emulsion pH | SV (nat) | SV (pH = 7.0) |
|---|---|---|---|---|---|
| 26C | 1 | 5.13 | 5.2 | 2.1 | 1.2 |
| 27 | 3 | 4.7 | 4.8 | 2.0 | 2.3 |
| 28 | 5 | 4.55 | 4.65 | 2.4 | 2.5 |
| 29 | 10 | 4.1 | 4.1 | 2.8 | 2.8 |
| 30 | 15 | 3.75 | 3.9 | 2.6 | 2.7 |
| 31 | 20 | 3.7 | 3.6 | 2.4 | 2.8 |

TABLE 6

Effect of Acid/Scavenger and Temperature on Emulsion QMM Breaking at 75% QMM Cationicity

| Example | % Solid | Age Temp (C.) | Time Hours | pH (0.2%) | SV (cps) | Acid/Scavenger |
|---|---|---|---|---|---|---|
| 32C | 30 | — | — | 5.5 | 1.40 | — |
| 33 | 24.4 | 60 | 16 | 4 | 2.30 | 25 mole % AA/ 10 mole % urea |
| 34 | 24.4 | 60 | 16 | 4.26 | 2.44 | 25 mole % AA/ 15 mole % urea |
| 35 | 24.4 | 65 | 16 | 3.98 | 2.91 | 25 mole % AA/ 10 mole % urea |
| 36 | 24.4 | 65 | 16 | 4.27 | 2.94 | 25 mole % AA/ 15 mole % urea |
| 37 | 24.4 | 70 | 16 | 3.98 | 2.94 | 25 mole % AA/ 10 mole % urea |
| 38 | 24.4 | 70 | 16 | 4.32 | 2.99 | 25 mole % AA/ 15 mole % urea |
| 39 | 24.4 | 80 | 3.67 | 3.98 | 2.70 | 25 mole % AA/ 10 mole % urea |
| 40 | 24.4 | 80 | 3.67 | 4.04 | 2.62 | 5 mole % AA/ 15 mole % urea |
| 41 | 24.4 | 65 | 16 | 4.26 | 2.59 | 12.5 mole % Guanidine Nitrate/12.5 mole % AA |

AA = Acetic Acid

TABLE 7

Effect of Varying Urea on the Lactic Acid Treatment of 55% Cationicity QMM at 5 Mole % Acid, 22.2% Solids and 70°C./7 Hours

| Example | Mole % Urea (on polymer) | S.V. (pH Nat) | S.V. (pH 7) | Emulsion pH |
|---|---|---|---|---|
| 42C | 1 | 1.87 (4.61) | 2.34 | 3.81 |
| 43 | 3 | 2.19 (4.52) | 2.94 | 3.84 |
| 44 | 5 | 2.22 (4.51) | 2.91 | 3.87 |
| 45 | 7 | 2.19 (4.62) | 2.91 | 4.06 |
| 46 | 10 | 2.29 (4.68) | 2.91 | 4.07 |
| 47 | 12.5 | 2.27 (4.74) | 3.07 | 4.25 |

TABLE 8

Examples of Inorganic/Organic Mixed Acids On QMM's At 75% Cationicity

| Example | Solids % | Stabilizer System | pH (0.2%) | S.V. (cps) |
|---|---|---|---|---|
| 48C | 30.37 | — | 7.0 | 1.80 |
| 49 | 25.0 | NaHSO₃ 25.0 m % | 4.36 | 2.25 |
| 50 | 25.0 | NaHSO₃ 18.5 m % | 4.6 | 2.37 |
| 51 | 25.0 | NaHSO₃ 15.0 m % | 4.6 | 2.17 |
| 52C | 25.0 | NaHSO₃ 10.0 m % | 4.99 | 1.74 |
| 53C | 25.0 | NaHSO₃ 18.5 m % Citric 5.0 m % | 3.67 | 1.36 |
| 54 | 25.0 | NaHSO₃ 18.5 m % Citric 2.4 m % | 3.95 | 2.10 |
| 55 | 25.0 | NaHSO₃ 18.5 m % Citric 1.8 m % | 4.17 | 2.30 |
| 56 | 25.0 | NaHSO₃ 18.5 m % Citric 1.2 m % | 4.15 | 2.30 |
| 57 | 25.0 | NaHSO₃ 18.5 m % Citric 1.2 m % | 4.08 | 2.32 |
| 58 | 25.0 | NaHSO₃ 18.5 m % Citric 0.8 m % | 4.25 | 2.20 |
| 59 | 25.0 | NaHSO₃ 18.5 m % Alum 0.85 m % | 4.01 | 2.24 |
| 60 | 25.0 | NaHSO₃ 18.5 m % Alum 0.073 m % | 4.09 | 2.15 |
| 61C | 25.0 | MBS 0.5 m % Citric 2.0 m % | 4.56 | 1.87 |
| 62 | 25.0 | MBS 1.0 m % Citric 2.0 m % | 4.36 | 2.15 |
| 63 | 25.0 | MBS 2.0 m % Citric 2.0 m % | 4.38 | 2.64 |
| 64 | 25.0 | MBS 3.0 m % Citric 2.0 m % | 4.35 | 2.70 |
| 65 | 25.0 | MBS 4.0 m % Citric 2.0 m % | 4.33 | 2.56 |
| 66 | 25.0 | MBS 3.0 m % Citric 2.0 m % GHCl 1.0 m % | 4.30 | 3.09 |
| 67 | 25.0 | MBS 3.0 m % Citric 2.0 m % GHCl 3.0 m % | 4.26 | 2.94 |
| 68 | 25.0 | MBS 4.0 m % Citric 2.0 m % GHCl 5.0 m % | 4.27 | 2.84 |

MBS = Sodium Metabisulfate
GHCl = Guanidine Hydrochloride

TABLE 9

Examples of Use of Organic/Inorganic Acids on QMM at 35 Percent Cationicity Using 10 Mole % Urea

| Example | Acid Mole % | Alum Mole % | S.V. (Nat) | S.V. (pH 7) | Emulsion pH |
|---|---|---|---|---|---|
| 69C | 2.4 | 0.0 | 1.79 | 2.02 | 4.44 |
| 70 | 2.4 | 0.16 | 2.10 | 2.44 | 4.11 |
| 71 | 2.4 | 0.32 | 2.27 | 2.67 | 4.11 |

TABLE 9-continued

Examples of Use of Organic/Inorganic Acids on QMM at 35 Percent Cationicity Using 10 Mole % Urea

| Example | Acid Mole % | Alum Mole % | S.V. (Nat) | S.V. (pH 7) | Emulsion pH |
|---|---|---|---|---|---|
| 72C | 2.4 | 0.64 | 1.24 | 1.38 | 4.04 |
| 73C | 2.4 | 0.96 | 1.16 | 1.18 | 3.92 |

TABLE 10

Effect of Temperature on Treatments on QMM of 55% Cationicity at 21.7% Solids at 10 Mole % Urea and Various Lactic Acid Levels

| Example | Acid Mole % | Alum Mole % | Temp. °C./ Time hrs | SV (Nat) | SV (pH 7) | Emulsion pH |
|---|---|---|---|---|---|---|
| 74 | 5 | 0 | 80/4 | 2.62 | 2.87 | 4.2 |
| 75 | 5 | 0 | 70/7 | 2.49 | 3.09 | 4.29 |
| 76 | 5 | 0.08 | 80/4 | 2.74 | 2.87 | 4.18 |
| 77 | 5 | 0.08 | 70/7 | 2.89 | 3.02 | 4.3 |
| 78 | 5 | 0.2 | 80/4 | 2.86 | 3.11 | 4.01 |
| 79 | 5 | 0.2 | 70/7 | 2.82 | 3.02 | 4.34 |
| 80 | 5 | 0.4 | 80/4 | 2.84 | 3.19 | 3.67 |
| 81 | 5 | 0.4 | 70/7 | 2.65 | 3.06 | 4.25 |
| 82C | 5 | 1.6 | 80/4 | 1.32 | 1.77 | 3.18 |
| 83 | 5 | 1.6 | 70/7 | 1.20 | 1.44 | 3.69 |
| 84C | 5 | 1.6 | 60/16 | 1.16 | 1.57 | 2.93 |

TABLE 11

Thermal Stability of Treated QMM Microemulsion at 25%, 26% and 27% Solids Using 5 Mole % Urea and 3 Mole % Citric Acid

| | | 25% Solids | | 26% Solids | | 27% Solids | |
|---|---|---|---|---|---|---|---|
| Example | Day | SV (Nat) | SV (pH 7) | SV (Nat) | SV (pH 7) | SV (Nat) | SV (pH 7) |
| 85 | 0 | 2.89 | 2.96 | 2.62 | 2.91 | 2.20 | 2.80 |
| 86 | 1 | 3.02 | 3.57 | 3.09 | 3.66 | 2.22 | 3.09 |
| 87 | 4 | 3.24 | 2.87 | 2.97 | 2.99 | 2.44 | 2.65 |
| 88 | 5 | 3.36 | 3.26 | 2.86 | 3.11 | 2.37 | 2.67 |
| 89 | 8 | 3.21 | 3.52 | 2.94 | 3.02 | 2.27 | 2.34 |
| 90 | 10 | 3.21 | 3.37 | 2.76 | 3.09 | 2.20 | 2.45 |

TABLE 12

Thermal Stability of Treated QMM Microemulsion at 50° C. Using 20 Mole % Acetic Acid and 8 Mole % Ethylene Urea

| Example | % Solids | pH (0.2%) | SV (Nat) | SV (pH 7) |
|---|---|---|---|---|
| 91* | 27.0 | 4.22 | 2.56 | 2.84 |
| 91 | 27.0 | 4.47 | 2.47 | 2.72 |
| 93 | 27.0 | 4.52 | 2.56 | 2.69 |
| 94 | 27.0 | 4.66 | 2.57 | 2.70 |
| 95 | 27.0 | 4.60 | 2.52 | 2.65 |
| 96 | 27.0 | 4.62 | 2.50 | 2.65 |
| 97 | 27.0 | 4.61 | 2.54 | 2.64 |
| 98 | 27.0 | 4.53 | 2.56 | 2.65 |
| 99 | 27.0 | 4.50 | 2.54 | 2.61 |
| 100 | 27.0 | 4.55 | 2.49 | 2.62 |
| 101 | 27.0 | 4.65 | 2.40 | 2.49 |

*treatment was 80° C. for 4 hours.

TABLE 13

Stability of Various QMM At Ambient Temperature

| Example | QMM-Cat. % | Age (mos.) | SV (Nat) | SV (pH 7) | Post Treatment Conditions |
|---|---|---|---|---|---|
| 102 | 75 | fresh | 2.47 | 2.65 | 20 mole % acetic acid |
| 103 | | 1 | 2.56 | 2.60 | 8 mole % ethylene urea |
| 104 | | 4 | 2.50 | 2.62 | 80° C./4 hours |
| 105 | | 5 | 2.40 | 2.68 | |
| 106 | | 6 | 2.40 | 2.60 | |
| 107 | | 7.5 | 2.45 | — | |
| 108 | | 9 | 2.34 | — | |
| 109 | 55 | fresh | 1.85 | 2.5 | 36 mole % acetic acid |
| 110 | | 2.25 | 2.2 | 2.61 | 10 mole % urea |
| 111 | | 4.5 | 2.37 | 2.56 | 70° C./5 hours |
| 112 | | 5.25 | 2.39 | 2.47 | |
| 113 | | 6.25 | 2.44 | 2.54 | |
| 114 | | 7.25 | 2.64 | 2.62 | |
| 115 | | 10.75 | 2.44 | 2.35 | |
| 116 | | 11.75 | 2.54 | 2.37 | |
| 117 | 55 | fresh | 2.37 | 2.79 | 36 mole % acetic acid |
| 118 | | 3.75 | 2.52 | 2.79 | 10 mole % urea |
| 119 | | 5.25 | 2.45 | 2.65 | 0.1 mole % alum |
| 120 | | 6.25 | 2.74 | 2.84 | 70° C./5 hours |
| 121 | | 9.75 | 2.49 | 2.64 | |
| 122 | | 10.75 | 2.49 | 2.54 | |
| 123 | 35 | fresh | 2.81 | 3.04 | 36 mole % acetic acid |
| 124 | | 1 | 2.82 | 2.97 | 10 mole % urea |
| 125 | | 2 | 2.74 | 2.91 | 0.1 mole % alum |
| 126 | | 5.5 | 2.57 | 2.72 | 70° C./5 hours |
| 127 | | 6.5 | 2.56 | 2.62 | |
| 128 | 17 | fresh | 2.70 | 2.92 | 36 mole % acetic acid |
| 129 | | 1 | 2.84 | 2.97 | 10 mole % urea |
| 130 | | 2 | 2.94 | 2.77 | 0.1 mole % alum |
| 131 | | 5.5 | 2.65 | 2.72 | 70° C./5 hours |
| 132 | | 6.5 | 2.61 | 2.65 | |

TABLE 14

Effect of Varying Post-Addition of Water to 55% QMM 29.9 Mole % Acetic Acid on Polymer

| Example | Wt. % added H$_2$O (on emul.) | % Solids | SV (Nat) | SV (pH 7) | % Polymer Ag. Phase |
|---|---|---|---|---|---|
| 133 | 19.3 | 20.15 | 2.84 | 3.02 | 33.3 |
| 134 | 15.0 | 21.05 | 2.37 | 2.70 | 34.8 |
| 135 | 12.0 | 21.73 | 2.35 | 2.50 | 35.9 |
| 136 | 10.0 | 22.20 | 1.95 | 2.17 | 36.7 |
| 137 | 5.0 | 23.49 | 1.42 | 1.48 | 38.8 |

TABLE 15

Effect of Polymer and Water Ratio of Stabilized QMM

| | Example No. | | | | | | |
|---|---|---|---|---|---|---|---|
| | 138 | 139 | 140 | 141 | 142 | 143 | 144 |
| E (wt.) | 50 | 55 | 56 | 58 | 60 | 62 | 64 |
| B (wt.) | — | 5 | 6 | 8 | 10 | 12 | 14 |
| A (wt.) | 30.46 | 35.46 | 36.46 | 38.46 | 40.46 | 42.46 | 44.46 |
| O (wt.) | 19.54 | 19.54 | 19.54 | 19.54 | 19.54 | 19.54 | 19.54 |
| A (%) | 61 | 64.5 | 65.1 | 66.3 | 67.4 | 68.5 | 69.5 |
| O (%) | 39 | 35.5 | 34.9 | 33.7 | 32.6 | 31.5 | 30.5 |
| A/O | 1.558 | 1.815 | 1.866 | 1.968 | 2.07 | 2.173 | 2.27 |
| Polymer Solids (%) in Aqueous Phase | 50.54 | 43.42 | 42.22 | 40.0 | 38.05 | 36.26 | 34.63 |
| Polymer (wt. %) | 49.42 | 45.53 | 44.71 | 43.15 | 41.69 | 40.33 | 39.05 |
| $H_2O$ (wt. %) | 50.58 | 54.47 | 55.29 | 56.85 | 58.67 | 59.67 | 60.95 |
| N-95 | 1.5 | 1.5 | 1.5 | 1.5 | 1.5 | 1.5 | 1.5 |
| Solids (%) | 29.9 | 27.25 | 26.78 | 25.88 | 25.04 | 24.25 | 23.51 |
| Emulsion pH | 5.5 | 4.38 | 4.45 | 4.45 | 4.45 | 4.45 | 4.45 |
| pH (0.2%) | 5.4 | 4.38 | 4.31 | 4.16 | 4.17 | 4.11 | 4.11 |
| SV (cps) | 1.19 | 2.44 | 2.64 | 2.84 | 2.84 | 2.84 | 2.84 |
| pH (0.2%) | 7.0 | 7.0 | 7.0 | 7.0 | 7.0 | 7.0 | 7.0 |
| SV (cps) | 2.59 | 2.84 | 2.87 | 2.87 | 2.87 | 2.87 | 2.87 | a. E (wt.): wt. of QMM emulsion.
b. B (wt.): wt. of stabilizer added.
c. A (wt.): wt. of aqueous phase.
d. O (wt.): wt. of oil phase.
e. A (%): wt (%) of Aqueous.
f. O%: wt (%) of oil phase
g. A/O: wt. ration of aqueous phase and oil phase.
h. Post-added N-95 and LOPS are not included.
i. Polymer solids (%) in aqueous phase and polymer/$H_2O$ ratio in stabilized QMM are calculated using 5 mole % urea and 3 mole % citric stabilizer system.

TABLE 16

Typical Municipal Waste Treatment Facility*

| Example | Polymer | Average Time/Min. | Lbs./Ton Real | Floc. Size | 10 Sec. Drainage | Filtrate | Cake Solids |
|---|---|---|---|---|---|---|---|
| 145C | Untreated Polymer | 30 | 18 | <1 | 94 | Black Particles | — |
| 146C | | 60 | 18 | <1 | 94 | Black Particles | — |
| 147C | | 120 | 18 | <1 | 94 | Black Particles | — |
| 148C | | 30 | 80 | 1 | 156 | Slt. Fines | 27.6 |
| 150 | Treated Polymer | 30 | 18 | 4 | 182 | Slt. Fines | 26.0 |
| 143 | | 120 | 18 | 5 | 166 | Slt. Fines | 26.1 |

*Sludge Solids = 1.55%; pH = 7.2

EXAMPLES 151–154

The procedure of Example 2 is again followed except that the acid is replaced by sufficient amounts of 151) an amino acid, 152) B-rescorcilic acid, 153) phosphoric acid and 154) acrylic acid. In each instance, similar results are achieved.

EXAMPLE 155

The procedure of Example 36 is again followed except that the scavenger is replaced by a sufficient amount of melamine. Similar results are achieved.

EXAMPLES 156–163

The procedure of Example 16 is again followed except that an equivalent percentage of acrylamide is replaced by 156) diallyldimethyl ammonium chloride (30%), 157) N,N-dimethyl-acrylamide (8%), 158) N-vinylpyrrolidone (2%), 159) acrylic acid (10%), 160) 2-acrylamido-2-methylpropane sulfonic acid (20%), 161) N,N-dimethylaminopropyl acrylamide (20%), 162) methylenebisacrylamide (0.001%), and 163) acrylonitrile (27%). In each instance, substantially equivalent results are achieved.

We claim:

1. A method for treating a quaternized amino methylated acrylamide polymer microemulsion which comprises:
   (a) adding to said quaternized amino methylated acrylamide polymer microemulsion:
      (i) organic carboxylic acid in an amount sufficient to provide a pH of from about 3.6 to about 4.8 in the microemulsion;

(ii) from about 0.01 to about 30 mole percent of a formaldehyde scavenger compound, based on the total moles of quaternized amino methylated acrylamide polymer microemulsion; and (iii) water in an amount such that the aqueous phase of the resulting microemulsion comprises from about 10 to about 45 weight percent of quaternized amino methylated acrylamide polymer; and (b) heating the microemulsion obtained in step (a) to a temperature of from about 40° to about 80° C. for from about 3 to about 20 hours.

2. A method as defined in claim 1 wherein the polymer amino methylated polymer microemulsion acrylamide comprises (alk)acrylamide polymeric microparticles, said (alk) acrylamide polymer being substituted with at least about 1 mole percent of tertiary aminomethyl groups and having an average particle size of from about 200 to about 4000 Å in diameter.

3. A method as defined in claim 1 wherein said amino methylated acrylamide polymer is a copolymer of an acrylamide and an ethylenically unsaturated comonomer.

4. A method as defined in claim 1 wherein said alkacrylamide polymer comprises polyacrylamide.

5. A method as defined in claim 2 wherein said tertiary amino methyl groups are a reaction product of an amide group with a formaldehyde and a secondary amine.

6. A method as defined in claim 5 wherein the secondary amine is selected from dimethylamine, methylethylamine, diethylamine, amylmethylamine, dibutylamine, dibenzylamine, piperidine, morpholine, ethanolmethylamine, diethanolamine or mixtures thereof.

7. A method as defined in claim 6 wherein said secondary amine comprises dimethylamine.

8. A method as defined in claim 5 wherein said formaldehyde is selected from aqueous formaldehyde, formalin, paraformaldehyde, trioxane or mixtures thereof.

9. A method as defined in claim 1 wherein said (alk) acrylamide polymer is quaternized with dimethyl sulfate, methyl bromide, methyl chloride, ethyl chloride, methyl iodide, benzyl chloride, benzyl bromide, allyl chloride or mixtures thereof.

10. A method as defined in claim 1 wherein said organic carboxylic acid is selected from acetic acid, succinic acid, lactic acid, maleic acid, fumaricacid, formic acid, acrylic acid, citric acid and mixtures thereof.

11. A method as defined in claim 1 wherein said formaldehyde scavenger is selected from urea, ethylene urea, guanidine salts, sulfurous acid, sodium bisulfite, sodium metabisulfite, phosphorous acid and mixtures thereof.

12. A method as defined in claim 1 wherein said formaldehyde scavenger is employed in an amount ranging from about 0.6 to about 15 mole % based on the total moles of quaternized amino methylated acrylamide polymer microemulsion.

13. A method as defined in claim 1 wherein said pH ranges from about 3.8 to about 4.6.

14. A process for flocculating suspended solids comprising adding to said suspended solids a synthetic polymer flocculant material comprising a solution of a polymer produced by a method for treating a quaternized amino methylated acrylamide polymer microemulsion which comprises:

(a) adding to said quaternized amino methylated acrylamide polymer microemulsion:
(i) organic carboxylic acid in an amount sufficient to provide a pH of from about 3.6 to about 4.8 in the microemulsion;
(ii) from about 0.01 to about 30 mole percent of a formaldehyde scavenger compound, based on the total moles of quaternized amino methylated acrylamide polymer microemulsion; and (iii) water in an amount such that the aqueous phase of the resulting microemulsion comprises from about 10 to about 45 weight percent of quaternized amino methylated acrylamide polymer; and (b) heating the microemulsion obtained in step (a) to a temperature of from about 40° to about 80° C. for from about 3 to about 20 hours.

15. A process as defined in claim 14 wherein the polymer amino methylated polymer microemulsion acrylamide comprises (alk)acrylamide polymeric microparticles, said (alk) acrylamide polymer being substituted with at least about 1 mole percent of tertiary aminomethyl groups and having an average particle size of from about 200 to about 4000 Å in diameter.

16. A process as defined in claim 14 wherein said amino methylated acrylamide polymer is a copolymer of an acrylamide and as ethylenically unsaturated comonomer.

17. A process as defined in claim 14 wherein said alkacrylamide polymer comprises polyacrylamide.

18. A process as defined in claim 15 wherein said tertiary amino methyl groups are a reaction product of an amide group with a formaldehyde and a secondary amine.

19. A process as defined in claim 18 wherein secondary amine is selected from dimethylamine, methylethylamine, diethylamine, amylmethylamine, dibutylamine, dibenzylamine, piperidine, morpholine, ethanolmethylamine, diethanolamine or mixtures thereof.

20. A process as defined in claim 19 wherein said secondary amine comprises dimethylamine.

21. A process as defined in claim 18 wherein said formaldehyde is selected from aqueous formaldehyde, formalin, paraformaldehyde, trioxane or mixtures thereof.

22. A process as defined in claim 14 wherein said (alk) acrylamide polymer is guaternized with dimethyl sulfate, methyl bromide, methyl chloride, ethyl chloride, methyl iodide, benzyl chloride, benzyl bromide, allyl chloride or mixtures thereof.

23. A process as defined in claim 14 wherein said organic carboxylic acid is selected from acetic acid, succinic acid, lactic acid, maleic acid, fumaric acid, formic acid, acrylic acid, citric acid and mixtures thereof.

24. A process as defined in claim 23 wherein said formaldehyde scavenger is selected from urea, ethylene urea, guanidine salts, sulfurous acid, sodium bisulfite, sodium metabisulfite, phosphorous acid and mixtures thereof.

25. A process as defined in claim 23 wherein said formaldehyde scavenger is employed in an amount ranging from about 0.6 to about 15 mole % based on the total moles of guaternized amino methylated acrylamide polymer microemulsion.

26. A process as defined in claim 14 wherein said pH ranges from about 3.8 to about 4.6.

27. A method as claimed in claim 1, wherein said organic carboxylic acid is comprised of a mixture of organic carboxylic acid and inorganic acid having a molar excess of organic carboxylic acid.

28. A method as claimed in claim 27, wherein said inorganic acid is aluminum sulfate or aluminum chloride.

29. A process as claimed in claim 14, wherein said organic carboxylic acid is comprised of a mixture of organic carboxylic acid and inorganic acid having a molar excess of organic carboxylic acid.

30. A process as claimed in claim 29, wherein said inorganic acid is aluminum sulfate or aluminum chloride.

* * * * *

UNITED STATES PATENT AND TRADEMARK OFFICE
CERTIFICATE OF CORRECTION

PATENT NO. : 5,670,615
DATED : Sep. 23, 1997
INVENTOR(S) : Sun Yi Huang, Andrea Leon-Bay, Joseph Michael Schmitt, Paul S. Waterman It is certified that error appears in the above-identified patent and that said Letters Patent is hereby corrected as shown below:

In column 22, Claim 22, "guaternized" should read "quaternized."

Signed and Sealed this

Sixteenth Day of December, 1997

Attest:

BRUCE LEHMAN

Attesting Officer     Commissioner of Patents and Trademarks